No. 863,078. PATENTED AUG. 13, 1907.
A. MERZ.
FISH HOOK.
APPLICATION FILED MAY 29, 1907.

Witnesses. Inventor.
Anton Merz
By Wm Zimmerman
Attorney.

UNITED STATES PATENT OFFICE.

ANTON MERZ, OF CHICAGO, ILLINOIS.

FISH-HOOK.

No. 863,078.  Specification of Letters Patent.  Patented Aug. 13, 1907.

Application filed May 29, 1907. Serial No. 376,266.

*To all whom it may concern:*

Be it known that I, ANTON MERZ, a citizen of the United States, residing in Chicago, Cook county, Illinois, have invented certain new and useful Improvements in Fish-Hooks, of which the following is a full and correct specification, reference being had to the hereto accompanying drawing, forming a part hereof, and in which—

Figure 1:
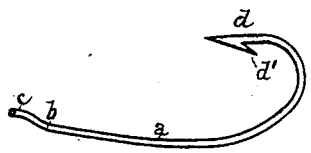
Figure 2:
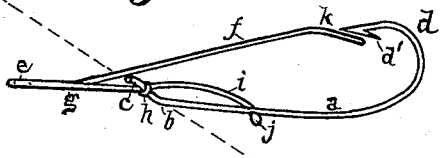
Figure 3:

Figure 1 shows my new hook-shank and hook in elevation; Fig. 2 shows my new hook and its holder in elevation; Fig. 3 shows my said device in plan view.

Like reference letters denote like parts throughout.

The object of my invention is to provide a fish-hook in which the shank of the hook shall be separable from its holder, the latter alone being attached to the line, the hook-shank being of uniform cross-area and sectional diameter throughout, which may then pass through the wound-opening made by the hook and, thereby, be avoided the troublesome as well as cruel operation of removing the barbed part of the hook by a reverse motion against the spur $d'$ constructed expressly to counteract said motion.

To attain said desirable ends I construct my said new and improved fish-hook in substantially the following manner, namely: I make an ordinary fish-hook $d\ d'$ on the shank of which is omitted the eye, loop, flattened end, or other device to which the line is attached, thus producing a hook-shank $a$ of uniform diameter, and preferably, though not necessarily, as will appear, said shank has a slight bend at $b$ and a reverse bend $c$ at the end of said shank. For said hook I provide a holder formed of the elements $f$ and $g$ united by an eye $e$ into the latter of which the line is fastened. Near the middle of the element $g$ there is a loop or eye $h$ the plane of which is, approximately, transverse to the plane of the parts $f$ and $g$ having an opening just large enough to receive the part $c\ b$ of the shank $a$, and from said loop or eye $h$ extends a fore-arm or continuation of said arm forming a slightly curved part $i$ the end of which is first bent downward in the plane of the arms $f$ and $g$ and then bent into a hook $j$ transverse to the end of said fore-arm, substantially as shown. The end of the shank, $b\ c$, slides freely in the eye $h$ when the shank $a$ is ranged in the direction of the broken line $n\ n$ but binds in said eye when brought to its normal position or place in the hook $j$, in which it is shown, thereby causing spring-resistance to the elements $a$ and $i$ when the former lays in the hook $j$. In said latter position no amount of force, short of that which would break or permanently derange the device, can separate said hook-shank from its holder.

When a fish is to be taken from the hook $d$ the hook $j$ is released from the shank $a$ and then from the eye $h$ after which, instead of reversing the motion of the parts $d\ d'$ they are advanced, thus drawing the smooth parts $a\ b\ c$ through the wound, whereby is avoided the cruel operation of withdrawing the barb $d'$ and, furthermore, said operation is performed in, comparatively, a very short time and tends, in every way, to save the life of the fish. The said shank can instantly be replaced in its holder.

The drawing shows a weed-guard $f\ k$ formed of the arm $f$ and loop $k$, but said elements are not necessary, or essential to the functions of my contrivance because, as is now clearly apparent, the loop $e$ may be formed of the end of the arm $g$ and then the parts $f\ k$ may be omitted, the holder part of the device being complete with the arm $g$ loop or eye $h$ and fore-arm $i$ with its transverse hook $j$.

What I claim is:

The combination with a hook-shank, of an arm, looped for said shank, a fore-arm beyond said loop ending in a hook, said hook-shank held in said hook.

ANTON MERZ.

Witnesses:
WM. ZIMMERMAN,
JOHN P. MARSH.